3,262,987
CURABLE COMPOSITIONS CONTAINING MIXTURES OF EXO AND ENDO DICYCLOPENTADIENE
Charles W. McGary, Jr., South Charleston, Paul S. Starcher, Charleston, and Samuel W. Tinsley, South Charleston, W. Va., assignors to Union Carbide Corporation, a corporation of New York
Filed July 18, 1961, Ser. No. 124,887
11 Claims. (Cl. 260—835)

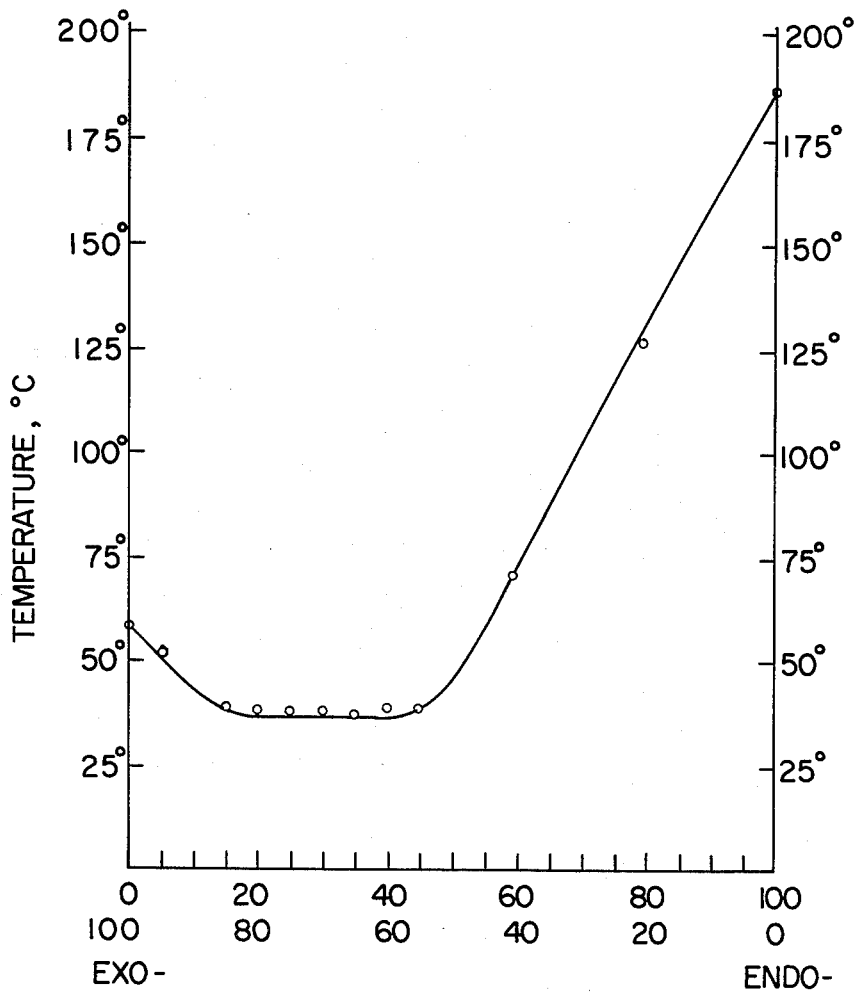
INVENTORS
CHARLES W. McGARY, JR.
PAUL S. STARCHER
SAMUEL W. TINSLEY
BY Vincent P. Pirri
ATTORNEY

United States Patent Office 3,262,987
Patented July 26, 1966

This invention relates to mixtures of diepoxides of endo-dicyclopentadiene and exo-dicyclopentadiene. In one aspect, the invention relates to curable, polymerizable compositions comprising the diepoxides of endo-dicyclopentadiene and exo-dicyclopentadiene, and an active organic hardener. In other aspects, the invention relates to the fusible thermosetting intermediate reaction products and to the cured, polymerized products which result from the reaction of the above-said curable compositions.

In recent years, there has been a marked growth in the use of polyepoxide monomers, in resin-forming operations, for application in fields such as coating, laminating, bonding, molding, casting, encapsulating, and the like. A particularly useful and commercially available polyepoxide monomer in such fields is the diepoxide of endo-dicyclopentadiene. However, the high melting point of the diepoxide of endo-dicyclopentadiene, i.e., about 188° C., gives rise to several disadvantages and limitations. During storage and in transit, the aforesaid diepoxide tends to block and cake. Moreover, for many fields of application it is desirable to prepare a homogeneous, curable epoxide formulation which possesses a relatively mobile viscosity. One route for obtaining homogeneity and reduction of viscosity of a viscous liquid, or solid, curable formulation which contains the diepoxide of endo-dicyclopentadiene is by the application of heat. However, extended heating can result in premature and localized curing, or the expulsion of the components comprising the formulation, or the promotion of high exothermic heat accumulations during subsequent curing cycles. In addition, the application of heat to a relatively large batch, curable formulation can result, also, in charring, ignition, unhealthy fumes, and uncontrollable exotherms. Several of the above illustrated disadvantages can be minimized by employing relatively small batches of the curable formulation; however, such a procedure drastically limits the fields of application especially where large volume production is required. Another route for preparing a more workable and manageable curable epoxide formulation is by the use of non-reactive, inert, normally-liquid solvents. However, this route entails additional equipment, additional procedures, and is time consuming. Moreover, some solvent may be trapped in the cured resin, or it may produce bubbles which are trapped in the cured resin, thereby creating irregularities and weak points. Unremovable amounts of such entrained bubbles and solvent lower the physical characteristics of the resin, e.g., flexural strength, hardness, impact strength, heat distortion point, etc., and, in addition, provide sites for attack by chemicals.

The epoxy resin artisan is confronted oftentimes with the above-enumerated disadvantages when employing the diepoxide of endo-dicyclopentadiene as the epoxide component in the curable formulation. To a large degree, these disadvantages can be overcome by employing the diepoxide of exo-dicyclopentadiene in lieu of the diepoxide of endo-dicyclopentadiene in the curable epoxide formulation. However, the diepoxide of exo-dicyclopentadiene is not readily available in the commercial sense, it is more expensive than the corresponding endo isomer, and it possesses a melting point of approximately 58° C. Consequently, concrete disadvantages still exist even if one chose to replace in toto the endo isomer with the exo isomer in curable epoxide formulations.

To a tangible degree, the epoxy resin artisan can minimize, also, some of the aforementioned disadvantages by employing a monoepoxy compound or a diepoxide compound as a "reactive diluent" for the diepoxide of endo-dicyclopentadiene. Illustrative "reactive diluents" include butyl glycidyl ether, bis(2,3-epoxycyclopentyl) ether, 4-vinylcyclohexene dioxide, limonene dioxide, 6-methyl-3,4-epoxycyclohexylmethyl 6-methyl-3,4-epoxycyclohexanecarboxylate, diglycidyl diether of bis(4-hydroxyphenyl)-2,2-propane, and the like. However, the use of "reactive diluents," though overcoming certain disadvantages illustrated supra, can introduce additional problems and drawbacks. For instance, the rates of reactivity of the various "reactive diluents" as compared with the rate of reactivity of the diepoxide of endo-dicyclopentadiene are manifestly different such that there is, in general, a sacrifice of one or more desirable properties in the ultimate cured resin. Moreover, a curable formulation containing the diepoxide of endo-dicyclopentadiene and a conventional "reactive diluent" can be partially cured to a so-called "B-stage" resin, i.e., an intermediate, fusible, organic solvent-soluble, partially cured resin, which generally possesses, at 25° C., a shelf life of less than one month.

It has been discovered quite unexpectedly, indeed, that an epoxide mixture which contains from about 85 to about 55 weight percent of the diepoxide of exo-dicyclopentadiene and from about 15 to about 45 weight percent of the diepoxide of endodicyclopentadiene (based on the total weight of said exo and endo isomers) can be employed as an epoxide component in a curable formulation which, to all intents and purposes, substantially minimizes or eliminates the disadvantages illustrated previously. Moreover, as will be apparent from a consideration of the drawing, a diepoxide mixture containing from about 85 to about 55 parts by weight of the exo isomer and from about 15 to about 45 parts by weight of the endo isomer, based on 100 parts by weight of the total exo and endo isomers, begins to melt at an average, essentially uniform temperature of about 37.5°±1.5° C. This highly unexpected and unobvious advantage re the melting point of the aforesaid diepoxide mixture can result in curable formulations which can be made homogeneous, by heating, at relatively low temperatures. As such, the disadvantages which can result from extended heating at relatively high temperatures, or by the use of inert solvents, or by the use of dissimilar "reactive diluents" are essentially minimized or avoided. In addition, "B-stage" resins prepared from a curable formulation containing for example, as the diepoxide components, from about 85–55 weight percent of the exo-dicyclopentadiene isomer and from about 15–45 weight percent of the endo-dicyclopentadiene isomer (based on the total weight of said exo and endo isomers), maleic anhydride, and 1,1,1-trimehtylolpropane, possess a shelf life, at 25° C., of up to one year, and more. In different language, the "B-stage" resin will remain as an intermediate, fusible, organic solvent-soluble, partially cured resin for periods of time ranging up to one year, and more, before becoming thermoset and infusible. This advantage has immediate significance to the manufacturer and the epoxy resin formulator. By way of further unexpected advantages, it was observed that the curable formulation which contained from about 85 to about 55 weight percent of the diepoxide of exo-dicyclopentadiene and from about 15 to about 45 weight percent of the diepoxide of endo-dicyclopentadiene, resulted in cured, thermoset resins which exhibited the same properties, or markedly improved properties, than resins prepared from curable formulations which contained either the exo isomer or the endo isomer as the sole diepoxide component.

Accordingly, one or more of the following objects will be achieved by the practice of the invention.

It is an object of the invention to prepare a novel admixture which contains from about 85 to about 55 weight percent of the diepoxide of exo-dicyclopentadiene and from about 15 to about 45 weight percent of the diepoxide of endo-dicyclopentadiene, based on the total weight of the diepoxides of the endo and exo isomers. It is another object of the invention to prepare a novel curable formulation which contains the aforementioned mixture of diepoxide isomers, and an active organic hardener. A further object of the invention is to prepare a novel curable expoxide formulation which results in several significant and unexpected advantages such as those illustrated supra. Numerous other objects will become apparent to those skilled in the art from a consideration of the specification.

The drawing represents graphically the melting points of the diepoxide of exo-dicyclopentadiene, the diepoxide of endo-dicyclopentadiene, and mixtures of said diepoxides. Operative Example 1 described hereinafter further discusses said drawing.

The broad aspect of the invention, as intimated previously, is directed to a composition containing from about 85 to about 55 weight percent of the diepoxide of exo-dicyclopentadiene and from about 15 to about 45 weight percent of the diepoxide of endo-dicyclopentadiene, based on the total weight of the aforesaid diepoxides. The preparation of these diepoxide isomers is documented in the literature. For example, endo-dicyclopentadiene can be prepared via the well-known Diels-Alder synthesis of cyclopentadiene. The reaction of a purified sample of said endo-dicyclopentadiene with at least two mols of an epoxidizing agent, per mol of said endo-dicyclopentadiene, yields a reaction product mixture which contains the diepoxide of endo-dicyclopentadiene. The resulting diepoxide then can be recovered via techniques well established to the art, e.g., distillation, fractionation, crystallization, etc. On the other hand, hydrogen chloride can be added to endo-dicyclopentadiene to give exo-dicyclopentadienyl chloride, followed by treatment with sodium hydroxide to yield exo-dicyclopentadiene. The reaction of said exo-dicyclopentadiene with at least two mols of an epoxidizing agent, per mol of said exo-dicyclopentadiene, results in a reaction product mixture which contains the diepoxide of exo-dicyclopentadiene. Crystallization of said reaction product mixture, followed by recrystallization, gives a highly purified sample of the diepoxide of exo-dicyclopentadiene.

Highly desirable epoxidizing agents which can be employed in the above illustrated epoxidation reactions are the organic peracids, e.g., peracetic acid, perpropionic acid, perbenzoic acid, monoperphthalic acid, perdodecanoic acid, etc., preferably dissolved in an inert, normally liquid organic vehicle, e.g., ethyl acetate, acetone, etc. A suitable epoxidation reaction temperature range is from about 0° C. to about 100° C., preferably from about 20° C. to about 80° C.

Various embodiments of the invention are directed to curable compositions which contain the novel diepoxide admixture and an active organic hardener, to the partially cured resins resulting therefrom, and to the cured, thermoset resins resulting therefrom. Illustrative active organic hardeners are, for example, polycarboxylic acids (including polycarboxy polyesters), polycarboxylic acid anhydrides, polyols, polythiols, polyisocyanates, polyacyl halides, and the like. The active organic hardeners illustrated hereinafter can be employed in a curing amount, that is, an amount which is sufficient to cause the curable system comprising the novel diepoxide admixture to become a thermosetting or thermoset copolymeric resin. A single active organic hardener or a mixture of active organic hardeners can be employed in the curable compositions.

Representative polycarboxylic acids which are contemplated include, for instance, oxalic acid, succinic acid, glutaric acid, adipic acid, suberic acid, alkylsuccinic acids, alkenylsuccinic acids, maleic acid, itaconic acid, allylmalonic acid, 3-hexynedioic acid, 1,2-cyclohexanedicarboxylic acid, phthalic acid, terephthalic acid, and the like. It is desirable to employ the polycarboxylic acid and diepoxide admixture in such relative amounts so as to provide from about 0.1 to about 2.0 carboxy groups, i.e., —COOH groups, of said acid per epoxy group, i.e.,

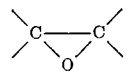

group, of said diepoxide admixture.

Illustrative polycarboxylic acid anhydrides include, for example, phthalic anhydride, tetrahydrophthalic anhydride, maleic anhydride, glutaric anhydride, succinic anhydride, nonenylsuccinic anhydride, 1,8-naphthalic anhydride, lower alkyl substituted-bicyclo[2.2.1]hept-5-ene-2,3-dicarboxylic anhydride, methylbicyclo[2.2.1]hept-2-ene-2,3-dicarboxylic anhydride, and the like. The polycarboxylic acid anhydride and diepoxide admixture are employed in such relative amounts so as to provide from about 0.1 to about 4.0 carboxy groups of said anhydride per epoxy group of said diepoxide admixture. It should be noted that by the expression "carboxy groups of said anhydride" is meant the carboxy groups which would be contained by the corresponding polycarboxylic acid. For example, succinic anhydride does not possess any carboxy groups per se; however, the corresponding polycarboxylic acid is succinic acid which contains two free carboxy groups. Thus, succinic anhydride has two carboxy groups as applied in the above expression. In different language, by the expression "carboxy groups of said anhydride" is meant the carboxy groups contained in the "hydrated" polycarboxylic acid anhydride.

Representative polyols include, by way of examples, ethylene glycol, diethylene glycol, the polyethylene glycols, propylene glycol, the polypropylene glycols, 1,1,1-trimethylolpropane, the polyvinyl alcohols, the cyclopentanediols, the cyclohexanediols, resorcinol, catechol, bis(4-hydroxyphenyl)-2,2-propane, 1,8-naphthalenediol, and the like. It is pointed out that the term "polyol," as used herein, includes those organic compounds which have at least two hydroxy (—OH) groups and they can be alcoholic hydroxy groups, phenolic hydroxy groups, or both alcoholic and phenolic hydroxy groups. The term "polyol" preferably encompasses the polyhydric alcohols and the polyhydric phenols. In general, the proportions of polyol and diepoxide admixture are such so as to provide from about 0.1 to about 2.0 hydroxy groups of said polyol per epoxy group of said diepoxide admixture.

The polycarboxy polyesters which are contemplated are those polyesters which contain at least two carboxy groups in the average molecule. The polycarboxy polyesters can be prepared by known condensation procedures, employing mol ratios favoring greater than equivalent amounts of polycarboxylic acid or polycarboxylic acid anhydride with relation to the polyhydric alcohol. More specifically, the amount of polycarboxylic acid or polycarboxylic acid anhydride which is employed in the esterification reaction should contain more carboxy groups, collectively, than are required to react with the hydroxy groups contained in the amount of polyhydric alcohol so that the resulting esterified product, i.e., polycarboxy polyester, contains at least two free carboxy groups in the average polycarboxy polyester molecule. The polycarboxylic acids, polycarboxylic acid anhydrides, and polyols which can be employed in the preparation of the polycarboxy polyesters have been illustrated previously. The polycarboxy polyesters can be obtained by condensing, in accordance with known procedures, a polyhydric alcohol and a polycarboxylic acid or a polycarboxylic acid anhydride. This condensation reaction may be conducted, for example, by heating the reactants to a temperature within the range from 100° C. to 200° C. with or without an acidic catalyst. Water formed by the condensation reaction may be removed by distillation. The course of the reaction may be followed by making acid number determinations and the reaction can be stopped when a suitable polycarboxy polyester has been obtained. Preferred relative proportions of polycarboxy polyester and diepoxide admixture provide from about 0.1 to about 2.0 carboxy group of said polycarboxy polyester per epoxy group of said diepoxide admixture.

A particularly preferred embodiment of the invention is directed to the preparation of intermediate, fusible, organic solvent-soluble, reaction products which are obtained by the partial cure of the novel curable composition containing the novel diepoxide admixture and at least two active organic hardeners, preferably a polycarboxylic acid anhydride and a polyol such as those illustrated previously. As intimated supra, the intermediate, fusible, organic solvent-soluble, reaction products, i.e., so-called B-stage resins, possess a shelf life of up to one year, and more, before becoming thermoset and infusible.

Acidic and basic catalysts also can be employed in the aforementioned curable compositions. Illustrative catalysts include, for example, the metal halide Lewis acids, e.g., boron trifluoride, aluminum chloride, zinc chloride, stannic chloride, ferric chloride, boron trifluoride-piperidine complex, boron trifluoride-1,6-hexanediamine complex, boron trifluoride-monoethylamine complex, boron trifluoride-dimethyl ether complex, boron trifluoride-diethyl ether complex, boron trifluoride-dipropyl ether complex, and the like; the strong mineral acids, e.g., phosphoric acid, polyphosphoric acid, and the like; the saturated aliphatic hydrocarbon sulfonic acids and the aromatic hydrocarbon sulfonic acids, e.g., ethanesulfonic acid, propanesulfonic acid, benzenesulfonic acid, toluenesulfonic acid, naphthalenesulfonic acid, lower alkyl substituted-benzenesulfonic acid, and the like; the stannous acylates, e.g., stannous acetate, stannous butyrate, stannous hexanoate, stannous octanoate, stannous benzoate, and the like; the stannic alkoxides, e.g., stannic butoxide, stannic 2-ethylhexoxide, and the like; the alkali metal hydroxides, e.g., sodium hydroxide, potassium hydroxide, and the like; the tertiary amines, e.g., trimethylamine, triethylamine, and the like. The boron trifluoride-amine complexes are highly preferred. The acidic or basic catalysts can be employed in amounts ranging from about 0.001 to about 10, and higher, weight percent, based on the total weight of diepoxide admixture.

The curing reaction, i.e., polymerization of the curable composition, can be conducted at a temperature in the range of from about 50° C. to about 260° C., and higher, and for a period of time ranging from several minutes to several days. The reaction time will depend, to a significant degree, on the temperature employed, the inclusion and choice of the acidic or basic catalyst, the choice of the active organic hardener, the degree of cure desired, and other considerations well known to the epoxy artisan.

Another embodiment of the invention is directed to a curable composition comprising the novel diepoxide admixture and an active organic hardener, and to the partially cured compositions, i.e., intermediate, fusible, organic solvent-soluble, partially cured products which result from the partial cure of the curable composition, said curable composition or partially cured compositions being dissolved in an inert normally-liquid organic medium such as xylene, methyl isobutyl ketone, butyl acetate, ethyl acetate, toluene, amyl acetate, and the like. The compositions dissolved in the above exemplary list of organic media can be used as, for example, surface coating which can be subsequently heat cured to hard, tough, scratch-resistant coatings.

The proportions of the curable composition, or the partially cured compositions, to organic media will depend on various factors such as the particular mixture employed, the degree or extent of the partial cure, the particular organic medium employed, and other considerations. In general, a solution comprising from about 10 to about 90 weight percent of the curable composition or the partially cured compositions, based on the total weight of said composition(s) and organic medium, is suitable; from about 40 to 70 weight percent of the composition(s), based on the total weight of said composition(s) and organic medium, is preferred. Should the solution comprising the uncured composition or partially cured compositions tend to "run" when applied to the surface, a conventional wetting agent and/or thixotropic agent can be added to the solution mixture to ensure a more uniform coating on the surface.

In still another embodiment, the invention is directed to the preparation of valuable varnishes which are obtained by the reaction of the novel diepoxide admixture with aliphatic monocarboxylic acids, at elevated temperatures, e.g., about 100° to 200° C., for a period of time ranging from 0.5 to 10 hours, and longer, followed by homopolymerizing the resulting reaction products (which contain residual or free epoxy and hydroxy groups) with an acidic catalyst such as those described previously, preferably at a temperature in the range of from about 25° to 200° C., to thus produce high molecular weight polymeric products commonly known to the art as a varnish. The amounts of aliphatic monocarboxylic acid and diepoxide admixture employed are such so as to provide from about 0.3 to about 0.7 carboxy group of monocarboxylic acid per epoxy group of diepoxide admixture. The unsaturated aliphatic monocarboxylic acids are preferred. Illustrative acids include hexanoic acid, caprylic acid, lauric acid, capric acid, myristic acid, oleic acid, linoleic acid, linolenic acid, oleostearic acid, licanic acid, ricinoleic acid, hexenoic acid, hexadienoic acid, octenoic acid. Acids derived from natural sources such as castor oil, dehydrated castor oil, coconut oil, cottonseed oil, citicaca oil, perilla oil, olive oil, safflower oil, sardine oil, soyabean oil, tall toil, tung oil, and the like, are advantageous to employ both from an economy standpoint and since highly useful varnishes result from the process. If desired, the reaction between the novel diepoxide admixture and the aliphatic monocarboxylic acid can be effected in the presence of an acidic or basic catalyst such as those described previously, and also, the reaction can be conducted in the presence of an inert normally-liquid organic medium. Suitable media include, for instance, the aromatic hydrocarbon, e.g., benzene, toluene, xylene, and the like; the saturated aliphatic and cycloaliphatic hydrocarbons, e.g., hexane, heptane, cyclopentane, cyclohexane, lower alkyl substituted-cyclohexane, and the like; the oxygenated organic compounds, e.g., ethyl acetate, butyl acetate, amyl acetate, acetone, methyl ethyl ketone, methyl isobutyl ketone, cyclohexanone, tetrahydrofuran, dioxane, diisopropyl ether, and the like.

The homopolymerization of the reaction products which contain residual or free epoxy and hydroxy groups can also be effected, if desired, in the presence of an inert normally-liquid organic medium such as those illustrated supra. The progress of the homopolymerization reaction can be observed by determining the relative viscosity of samples drawn from the reaction mixture. In this manner it is possible to produce partially polymerized compositions or essentially complete polymerized compositions. The resulting polymerized compositions can be classified as drying compositions or non-drying compositions. The former are those which contain ethylenic unsaturation whereas the latter are saturated compositions.

Both the drying and non-drying compositions are useful as modifiers for coating resins such as phenol-formaldehyde resins, melamineformaldehyde resins, alkyd resins, and the like. These compositions are outstanding as modifiers because they have a wide range of compatability, they impart improved caustic, water, and chemical resistance to the resin coatings they are modifying, and they impart improved flexibility and toughness. The drying compositions are capable of "drying" or curing to excellent protective coatings with or without the application of heat. It is generally desirable to employ various metallic salts of organic compounds known to the art as "dryers," to accelerate the drying process. The drying can be accomplished at temperatures in the range of from about 10° to about 250° C. for a period of time sufficient to produce the desired property in the resin. The concentration of the drier compound can range from about 0.001 to about 5.0 weight percent, and higher, based on the weight of the drying compound (polymer). Suitable driers include soluble compounds containing heavy metals, e.g., cobalt, lead, manganese, calcium, zinc, iron, and the like. Examples of such driers include cobalt naphthenate, lead octanoate, and the like. The drying compositions can be treated in the various ways familiar to the varnish and paint industries to produce special or advantageous effects.

In a yet further embodiment, valuable varnish compositions can be obtained by the reaction of the novel diepoxide admixture with polyols, preferably in the presence of an acidic catalyst such as those illustrated previously, at a temperature in the range of from about 25° to 250° C., for a period of time ranging from about 0.5 to 10.0 hours, and longer, followed by partial or essentially complete esterification of the fusible, polymeric polyhydric product with an aliphatic monocarboxylic acid, at elevated temperatures, to produce high molecular weight polymeric products (varnishes) which may contain residual or free hydroxy groups. The proportions of polyol and diepoxide admixture employed are such so as to provide from about 0.5 to about 1.5 hydroxy groups of polyol per epoxy group of diepoxide admixture. The polyols and aliphatic monocarboxylic acids which can be employed have been illustrated previously. The use of catalysts and solvents, if desired, have also been discussed supra.

As intimated previously, the novel curable compositions comprising the novel diepoxide admixture and active organic hardener can be readily handled in resin-forming operations such as coating, laminating, bonding, molding, casting, potting, encapsulating, and the like. These curable compositions are capable of accepting solid materials, such as fillers and pigments, for providing various effects in physical properties and coloration. With or without such added solid materials, these curable compositions can be made to fill small intricacies of molds without the necessity of applying high pressures or heating to high temperatures. Although such measures can be employed, if desired. These curable compositions can be cured in molds which have intricate surfaces, and the resulting molded resin exhibits exact and fine details of the mold. These curable compositions, also, can be advantageously employed in the potting of fragile articles such as electronic components.

The following examples are illustrative. Unless otherwise indicated, the examination or description of the products were conducted at room temperature, i.e., about 24° C. The heat distortion values were obtained at 264 pounds per square inch of stress in accordance with ASTM test method D-648-56T. Barcol hardness values were determined by the use of Barcol Impressor GYZJ-934-1.

EXAMPLE 1

Various admixtures of the diepoxide of endo-dicyclopentadiene and the diepoxide of exo-dicyclopentadiene were prepared, and the melting points of these admixtures were ascertained by heating the solid samples on 18 mm. glass disks. The diepoxide of exo-dicyclopentadiene was prepared by adding hydrogen iodide to endo-dicyclopentadiene, followed by reacting the resulting exo-dicyclopentadienyl iodide product with alcoholic potassium hydroxide thus producing a reaction product admixture containing exo-dicyclopentadiene. The resulting purified exo-dicyclopentadiene then was reacted with slightly more than 2 moles of peracetic acid (contained as a 25 weight percent solution in ethyl acetate), per mole of exo-dicyclopentadiene, at a temperature of about 70° C., and for a period of time sufficient to produce a reaction product admixture containing substantial amounts of the diepoxide of exo-dicyclopentadiene. This diepoxide isomer was recovered from the reaction product admixture via distillation, crystallization, and recrystallization techniques.

The pertinent data is set forth in Table I infra.

Table I

| Exo [1] | Endo [2] | Melting Point, ° C.[3] |
| --- | --- | --- |
| 100 | 0 | 57.5 |
| 95 | 5 | 53 |
| 85 | 15 | 39 |
| 80 | 20 | 38 |
| 75 | 25 | 38 |
| 70 | 30 | 38 |
| 65 | 35 | 36 |
| 60 | 40 | 39 |
| 55 | 45 | 39 |
| 40 | 60 | 69 |
| 20 | 80 | 125 |
| 0 | 100 | 188 |

[1] Weight percent of the diepoxide of exo-dicyclopentadiene, based on the total weight of diepoxide admixture.
[2] Weight percent of the diepoxide of endo-dicyclopentadiene, based on the total weight of diepoxide admixture.
[3] Melting point of diepoxide admixture at poin where solid phase and solid-liquid phase is in equilibrium.

The attached drawing represents, in graphic form, the data contained in Table I supra. It is apparent from an inspection of said drawing that the diepoxide admixture which contains from about 85 to 55 weight percent of the exo-isomer and from about 15 to about 45 weight percent of the endo-isomer unexpectedly results in an inverted plateau which possesses a melting point [1] of about 37.5° C. ±1.5° C. To an epoxy resin artisan, the above described data has high significance since there can be prepared relatively uniform, low melting curable formulations which contain the diepoxides of the exo- and endo-isomers over a wide concentration range. As such, the disadvantages enumerated previously with regard to curable formulations which contain either the exo-isomer or the endo-isomer are substantially minimized or avoided.

EXAMPLES 2–7

Various admixtures containing the diepoxide of exo-dicyclopentadiene (melting point of about 57.7° C.), the diepoxide of endo-dicyclopentadiene (melting point of about 190° C.), maleic anhydride (30.1 grams), and 1,1,1 - trimethylolpropane (6.9 grams) were prepared. The resulting admixtures then were poured into 6″ x 6″ x 0.25″ molds and cured for a period of 2 hours at 120° C. plus an additional 6 hours at 160° C. Thereafter the heat distortion temperature was determined for each sample. The pertinent data are set forth in Table II infra.

---

[1] Melting points of said diepoxide admixtures were determined where solid phase and solid-liquid phase were in equilibrium.

Table II

| Example Number | Exo-Monomer | | Endo-Isomer | | Heat Distortion Temperature, °F. |
|---|---|---|---|---|---|
| | Weight, Grams | Weight Percent [1] | Weight, Grams | Weight Percent [2] | |
| 2 | 34.7 | 55 | 28.3 | 45 | 356 |
| 3 | 37.8 | 60 | 25.2 | 40 | 363 |
| 4 | 44.1 | 70 | 18.9 | 30 | 367 |
| 5 | 53.6 | 85 | 9.4 | 15 | 358 |
| 6 | 63.0 | 100 | 0 | 0 | 368 |
| 7 | 0 | 0 | 63.0 | 100 | 347 |

[1] Weight percent of the diepoxide of exo-dicyclopentadiene, based on the total weight of diepoxide admixture.
[2] Weight percent of the diepoxide of endo-dicyclopentadiene, based on the total weight of diepoxide admixture.

EXAMPLES 8–13

Various admixtures containing the diepoxide of exo-dicyclopentadiene (melting point of about 57.7° C.), the diepoxide of endo-dicyclopentadiene (melting point of about 190° C.), maleic anhydride (30.1 grams), and 1,1,1-trimethylolpropane (6.9 grams) were prepared. The resulting admixtures then were poured into 6″ x 6″ x 0.25″ molds and cured for a period of 2 hours at 120° C., 6 hours at 160° C., and 6 hours at 200° C. Thereafter the heat distortion temperature was determined for each sample. The pertinent data are set forth in Table III infra.

Table III

| Example Number | Exo-Monomer | | Endo-Monomer | | Heat Distortion Temperature, °F. |
|---|---|---|---|---|---|
| | Weight, Grams | Weight Percent [1] | Weight, Grams | Weight Percent [2] | |
| 8 | 34.7 | 55 | 28.3 | 45 | 439 |
| 9 | 37.8 | 60 | 25.2 | 40 | 445 |
| 10 | 44.1 | 70 | 18.9 | 30 | 439 |
| 11 | 50.4 | 80 | 12.6 | 20 | 443 |
| 12 | 63.0 | 100 | 0 | 0 | 439 |
| 13 | 0 | 0 | 63.0 | 100 | 421 |

[1] Weight percent of the diepoxide of exo-dicyclopentadiene, based on the total weight of diepoxide admixture.
[2] Weight percent of the diepoxide of endo-dicyclopentadiene, based on the total weight of diepoxide admixture.

EXAMPLE 14

An admixture containing 25 grams of the diepoxide of exo-dicyclopentadiene and 75 grams of the diepoxide of endo-dicyclopentadiene was prepared. The resulting admixture was heated to approximately 39°–40° C. at which temperature a homogeneous solution was obtained.

A. To 42 grams of the above-said homogeneous solution, there were added methyl nadic anhydride (46 grams) and 1,2,6-hexanetriol (12 grams) in amounts so as to provide 1.0 carboxy group of the anhydride and 0.5 hydroxy group of the triol per epoxy group of the diepoxide admixture. The resulting admixture was heated to about 80° C. to effect solution. Upon cooling to about 24° C., there was obtained a liquid solution which possessed a viscosity of 263 centipoises (Brookfield viscometer, Model LVT, Spindle No. 2, 30 r.p.m.). After standing for seven days at ambient room temperature, the viscosity of the liquid solid increased to only 385 centipoises.

B. To 42 grams of the diepoxide of endo-dicyclopentadiene, there were added methyl nadic anhydride (46 grams) and 1,2,6-hexanetriol (12 grams) in amounts so as to provide 1.0 carboxy group of the anhydride and 0.5 hydroxy group of the triol per epoxy group of the diepoxide of endo-dicyclopentadiene. The resulting admixture was heated to about 110° C. to effect solution. Upon cooling to about 24° C., there was obtained a liquid-solid admixture which possessed a viscosity of about 134,000 centipoises (Brookfield viscometer, Model LVT, Spindle No. 3, 0.6 r.p.m.).

EXAMPLE 15

A mixture containing 30 weight percent of the diepoxide of endo-dicyclopentadiene and 70 weight percent of the diepoxide of exo-dicyclopentadiene, based on the total weight of the exo- and endo-isomers, and adipic acid is prepared. The relative proportions of the reactants provide 1.0 carboxy group of adipic acid per epoxy group of diepoxide admixture. The resulting admixture is heated to 120° C. for a period of 10 minutes, and upon cooling to room temperature, i.e., approximately 25° C., a fusible, organic solvent-soluble product is obtained. The resulting product is dissolved in methyl isobutyl ketone at 110° C., and an iron panel or strip is dipped into the resulting solution. The iron panel subsequently is removed from this solution, is air dried for 15 minutes, and is baked at 160° C. for 2 hours. A thin coating is observed on that portion of the dipped iron panel. The resulting coating on the panel is glossy and tough. The coating displays excellent adhesion to the panel.

EXAMPLE 16

A diepoxide admixture of 80 weight percent of the diepoxide of exo-dicyclopentadiene and 20 weight percent of the diepoxide of endo-dicyclopentadiene, and dehydrated castor oil acid are mixed in amounts so as to provide 0.5 carboxy group of said acid per epoxy group of said diepoxide admixture. The resulting mixture then is heated for 5 hours at 180° C. to give a viscous product mixture which contained residual or free epoxy groups and hydroxy groups. This viscous product mixture subsequently is charged to a round-bottomed flask which is fitted with an air stirrer, nitrogen purge line, thermometer, and dropping funnel. Sufficient xylene solvent is added to give a 90 weight percent solution and the temperature of the resulting admixture is brought to about 55° to 60° C. An amount of stannic chloride (0.3 weight percent based on the weight of said viscous product mixture) contained as a solution in ethyl acetate then is added dropwise to said admixture over a period of approximately 45 minutes. As the polymerization continues sufficient xylene is added thereto to facilitate stirring. The solids content of the resulting solution is about 55 weight percent. To the resulting high molecular weight polymeric product mixture (varnish), a Parkerized steel panel is dipped therein. The resulting coated panel is air-dried for 30 minutes plus baking at 170° C. for 30 minutes. The coated panel resistance to boiling water (one hour) and caustic (20 percent NaOH for 20 minutes) is excellent.

EXAMPLE 17

A diepoxide admixture of 75 weight percent of the diepoxide of exo-dicyclopentadiene and 25 weight percent of the diepoxide of endo-dicyclopentadiene, and soya bean oil acid are mixed in amounts so as to provide 0.4 carboxy group of said acid perepoxy group of said diepoxide admixture. The resulting mixture then is heated for 3 hours at 180° C. to give a viscous product mixture which contained residual or free epoxy groups and hydroxy groups. This viscous product mixture subsequently is charged to a round-bottomed flask which is fitted with an air stirrer, nitrogen purge line, thermometer, and dropping funnel. Sufficient xylene solvent is added to give a 80 weight percent solution and the temperature of the resulting admixture is brought to about 50° to 60° C. An amount of boron fluoride-diethyl ether complex (0.2 weight percent of boron trifluoride based on the weight of said viscous product mixture) contained in excess diethyl ether then is added dropwise to said admixture over a period of approximately 30 minutes. As the polymerization continues sufficient xylene is added thereto to facilitate stirring. The solids content of the resulting solution is about 50 weight percent. To the resulting high molecular weight polymeric product mixture (varnish), a Parkerized steel panel is dipped therein. The resulting coated panel is air-dried for 20 minutes plus baking at 170° C. for 45 minutes. The coated panel resistance to boiling water (one hour) and caustic (20 percent NaOH for 20 minutes) is excellent.

EXAMPLE 18

The following materials were placed in a 5-liter flask:

2350 g. maleic anhydride
1072 g. 1,2,6-hexanetriol

The mixture was heated for 40 hours at 103–105° C. after which a 200 gram sample was removed; it was very viscous at 24° C. To the remainder of material, there was added 806 grams of methyl ethyl ketone. At 25° C., the 80 percent solution had a viscosity of 1690 cp. (Brookfiedl Viscometer LVT).

To 930 grams of this mixture there was added 1070 grams of a mixture containing 65 parts by weight of the diepoxide of exo-dicyclopentadiene and 35 parts by weight of the diepoxide of endo-dicyclopentadiene, and 200 grams of methyl ethyl ketone. The viscosity was 92 centipoises at 25° C.

A strip of glass cloth, 181 weave, Volan A finish 10 x 180 inches, was passed through a tray containing the curable epoxy mixture. The cloth was thoroughly impregnated, passed over a roll, and draped over several rods, which rested on a wood-form. The cloth was dried for 8 minutes at 120° C., after which the impregnated cloth was removed from the oven and cooled. The cloth was cut in 10 x 10 inch sections and 12 plies were layed up between poly-vinyl fluoride) film and pressed under the following conditions: 3 minutes at contact (zero) pressure at 160° C.; 57 minutes at 30 pounds per square inch at 160° C. The film was removed and the resultant laminate was essentially free of voids and had excellent clarity; the thickness was 0.100–.108 inch. The laminate was post cured for 2 hours at 160° C., 2 hours at 200° C., 2 hours at 230° C., and 1 hour at 260° C. The fully cured laminate had the following properties:

| Property | ASTM No. | Result |
|---|---|---|
| Flexural strength | D-790-59T | 90,000 p.s.i. |
| Flexural modulus | D-790-59T | 3.6×10⁶. |
| Compressive strength | L-P-406Bª | 54,000 p.s.i. |
| Heat distortion Temperature | D-648-56 | 260° C. |

ª Federal Specification (Plastics), Method 1021.1, September 27, 1951, as amended September 25, 1952.

EXAMPLE 19

The following materials were heated at 100–105° C. for 3¼ hours:

3180 grams maleic anhydride
720 grams trimethylolpropane

To 368 grams of this mixture, there was added 632 grams of a mixture containing 65 parts by weight of the diepoxide of exo-dicyclopentadiene and 35 parts by weight of the diepoxide of endo-dicyclopentadiene. The mixture was completely liquid at 25° C. and had a viscosity of 688 centipoises. A laminate was prepared using wet lay-up techniques and 181 glass cloth with Volan A finish: part of the monomer mixture was poured on a sheet of Mylar film and one ply, 12 x 14 inches, was laid on the mixture. After the mixture penetrated the cloth, additional resin mixture was added and another ply was laid down. In this way 12 plies were impregnated; a top cover of Mylar film was added, and the bubbles were removed with a rolling pin. The bagged, impregnated cloth was pressed under the following conditions:

6 minutes at 130° C., contact (zero) pressure
14 minutes at 130° C., 30 p.s.i.
15 minutes at 160° C., 30 p.s.i.
15 minutes at 175° C., 30 p.s.i.

The laminate was removed from the press and from the Mylar film; it was clear and void free; it was post cured for 2 hours at 160° C. and 2 hours at 200° C. It had a flexural strength of 86,400 pounds per square inch and a flexural modulus of $4.25 \times 10^6$.

EXAMPLE 20

A solution containing 1890 grams of a mixture of about 65 parts by weight of the diepoxide of exo-dicyclopentadiene and 35 parts by weight of the diepoxide of endo-dicyclopentadiene, 906 grams of maleic anhydride, 204 grams of 1,1,1-trimethylolpropane, and 4175 grams of toluene was refluxed at 122°–130° C. for 5.5 hours. The acidity of the resulting solution was 1.55 cc. of N base/gram, which indicated that 62.5 percent of the carboxy groups had reacted. After dilution to 60 weight percent total solids by the addition of 525 grams of methyl ethyl ketone, the viscosity of the resulting solution was 80 centipoises at 25° C. The intermediate, fusible, organic solvent-soluble, partially cured resinous products (in solution) possessed a shelf life in excess of 10 months, i.e., the solution was still liquid and could be used in the preparation of preimpregnated glass cloth for making laminates.

EXAMPLE 21

A solution of 168 grams of the diepoxide of endo-dicyclopentadiene, 168 grams of the diglycidyl diether of bis(4-hydroxyphenyl)-2,2-propane, 138 grams of maleic anhydride, 26 grams of 1,1,1-trimethylolpropane, and 247 grams of toluene was refluxed at 121°–125° C. for 4.5 hours. The acidity of the resulting solution was 1.62 cc. of N base/gram, which indicated that 57.2 percent of the carboxy groups had reacted. After dilution to 60 weight percent total solids by the addition of 87 grams of methyl ethyl ketone, the viscosity of the resulting solution was 225 centipoises at 25° C. The intermediate, fusible, organic solvent-soluble, partially cured resinous products (in solution) possessed a shelf life of about one month, i.e., after a period of about one month the resinous products (in solution) became cross-linked (gelled). As such, said cross-linked products were no longer useful in many fields of application such as in the preparation of laminates.

EXAMPLE 22

There was prepared a mixture which contained 9 parts by weight of (a) a diepoxide mixture consisting of 55 weight percent of the diepoxide of exo-dicyclopentadiene and 45 weight percent of the diepoxide of endo-dicyclopentadiene, and 7.4 parts by weight of phthalic anhydride. The resulting mixture was heated to 120° C. for a period of 6 hours plus an additional 12 hours at 160° C. There was obtained a strong, tough resin which possessed a Barcol hardness of 60.

EXAMPLE 23

There was prepared a mixture which contained 9 parts by weight of (a) a diepoxide mixture consisting of 55 weight percent of the diepoxide of exo-dicyclopentadiene and 45 weight percent of the diepoxide of endo-dicyclopentadiene, and 5.0 parts by weight of succinic anhydride. The resulting mixture was heated to 120° C. for a period of 6 hours plus an additional 12 hours at 160° C. There was obtained a strong, tough resin which possessed a Barcol hardness of 55.

EXAMPLE 24

The materials listed below were added to a glass beaker, followed by heating to about 50° C. to melt the resulting admixture. After cooling said admixture to about 24° C., styrene was added thereto.

| Materials: | Weight, Grams |
|---|---|
| Diepoxide [1] | 153 |
| Maleic anhydride | 73 |
| 1,1,1-Trimethylolpropane | 16.1 |
| Styrene | 77.9 |

[1] Contains 80 weight percent of the diepoxide of exo-dicyclopentadiene and 20 weight percent of the diepoxide of endo-dicyclopentadiene, based on the total weight of diepoxide admixture.

To the above admixture, there was added 0.034 gram of benzoyl peroxide (contained as a solution in cyclohexanone). The resulting mixture then was poured into several bar molds, followed by heating for about 2 hours at 60° C., after which period of time hard gels were observed. Thereafter, heat was applied for a period of 6 hours at 120° C. plus an additional 6 hours at 200° C. The cured resin had a heat distortion temperature of 185° C. After further curing for 6 hours at 260° C., the resin had a heat distortion temperature of about 295° C.

EXAMPLE 25

An adduct of maleic anhydride (2352 grams) and 1,1,1-trimethylolpropane (1072 grams) was prepared by heating a mixture of the above said components for a period of about 3 hours at about 100° C. The following admixture then was prepared.

| | Grams |
|---|---|
| Diepoxide | 59.0 |
| Adduct | 41.0 |
| Styrene | 29.9 |

The diepoxide employed consisted of 60 weight percent of the diepoxide of exo-dicyclopentadiene and 40 weight percent of the diepoxide of endo-dicyclopentadiene. The diepoxide and adduct were preheated to about 53°–55° C. and mixed together, with stirring. The styrene component then was added to this mixture at about 24° C. The resulting solution had a viscosity of 172 centipoises at 25° C. Ten grams of the above said solution was cured for 2 hours at 70° C., 2 hours at 120° C., and 2 hours at 200° C. The resulting cured resin was very hard and strong. It is pointed out that the curable mixture possessed a low viscosity making said mixture highly useful in the preparation of laminates via the wet lay-up technique illustrated in Example 19. In addition, these curable formulations also are very effective in pre-impregnating glass roving which is useful in film winding.

Reasonable variations and modifications of the invention can be made or carried out in the light of the above disclosure without departing from the spirit and scope thereof.

What is claimed is:

1. A composition containing from about 85 to about 55 weight percent of the diepoxide of exo-dicyclopentadiene and from about 15 to about 45 weight percent of the diepoxide of endo-dicyclopentadiene, based on the total weight of the aforesaid diepoxides.

2. A curable composition containing a diepoxide admixture of from about 85 to about 55 weight percent of the diepoxide of exo-dicyclopentadiene and from about 15 to about 45 weight percent of the diepoxide of endo-dicyclopentadiene, based on the total weight of the aforesaid diepoxides; and an active organic hardener.

3. The curable composition of claim 2 wherein said active organic hardener is a polyol.

4. The curable composition of claim 2 wherein said active organic hardener is a polycarboxylic acid.

5. The curable composition of claim 2 wherein said active organic hardener is a polycarboxylic acid anhydride.

6. The curable composition of claim 2 wherein said active organic hardener is a polycarboxy polyester.

7. Intermediate, fusible, organic solvent-soluble, reaction products obtained by the partial cure of a curable composition containing from about 85 to about 55 weight percent of the diepoxide of exo-dicyclopentadiene and from about 15 to about 45 weight percent of the diepoxide of endo-dicyclopentadiene, based on the total weight of the aforesaid diepoxides; a polycarboxylic acid anhydride; and a polyol.

8. The composition defined in claim 7 wherein said polycarboxylic acid anhydride is maleic anhydride, and wherein said polyol is 1,1,1-trimethylolpropane.

9. A polymerizable composition containing from about 85 to about 55 weight percent of the diepoxide of exo-dicyclopentadiene and from about 15 to about 45 weight percent of the diepoxide of endo-dicyclopentadiene, based on the total weight of the aforesaid diepoxides; and an aliphatic unsaturated monocarboxylic acid in amounts so as to provide from about 0.3 to about 0.7 carboxy group of said acid per epoxy group of the aforesaid diepoxides.

10. The reaction products obtained by the partial cure of the composition defined in claim 9, said products containing free hydroxy and epoxy groups.

11. A varnish composition obtained by homopolymerizing the reaction products defined in claim 10.

References Cited by the Examiner

UNITED STATES PATENTS

| 2,962,469 | 11/1960 | Phillips et al. | 260—835 |
| 2,985,616 | 5/1961 | McGary et al. | 260—348 |
| 2,985,667 | 5/1961 | Tinsley et al. | 260—348 |

MURRAY TILLMAN, *Primary Examiner.*

LEON J. BERCOVITZ, *Examiner.*

J. A. KOLASCH, P. LIEBERMAN, *Assistant Examiners.*